(12) United States Patent
Brayman et al.

(10) Patent No.: US 7,918,006 B2
(45) Date of Patent: Apr. 5, 2011

(54) METHOD FOR JOINING ENDS OF SECTIONS OF PIPE

(76) Inventors: Semyon Brayman, West Bloomfield, MI (US); Alexander Rudovich, Minsk (BY)

(*) Notice: Subject to any disclaimer, the term of this patent is extended or adjusted under 35 U.S.C. 154(b) by 714 days.

(21) Appl. No.: 12/002,295

(22) Filed: Dec. 13, 2007

(65) Prior Publication Data
US 2008/0231042 A1    Sep. 25, 2008

Related U.S. Application Data

(60) Provisional application No. 60/896,287, filed on Mar. 22, 2007.

(51) Int. Cl.
 B23P 11/02   (2006.01)
 B23P 11/00   (2006.01)
 F16B 4/00    (2006.01)
(52) U.S. Cl. ............... 29/447; 29/508; 29/521; 285/41; 285/332; 403/273
(58) Field of Classification Search .............. 29/447, 29/508, 517, 521; 285/41, 332, 333; 403/273
See application file for complete search history.

(56) References Cited

U.S. PATENT DOCUMENTS

| 2,761,205 | A | * | 9/1956 | Siklosi ........................ 29/447 |
| 3,382,563 | A | * | 5/1968 | Teytu et al. .................. 29/447 |
| 4,026,006 | A |   | 5/1977 | Moebius |
| 2007/0210577 | A1 | * | 9/2007 | Pollack et al. ............... 285/333 |

FOREIGN PATENT DOCUMENTS

| SU | 603470 |    | 4/1978 |
| SU | 1703224 | A1 | 1/1992 |

* cited by examiner

*Primary Examiner* — Jermie E Cozart
(74) *Attorney, Agent, or Firm* — John R. Benefiel

(57) ABSTRACT

A method for making pipe joints on successive pipe sections introduced into an oil well as assembled into a pipeline in which the joints are substantially of the same dimensions as the pipe sections to allow for subsequent plastic expansion of the sections. In each joint, a female pipe end is tapered on the inside and an adjacent male end is tapered on the outside preferably with a complementary self locking taper which also has an interference fit. The female pipe end is heated to be expanded sufficiently to be assembled onto the male end and thereafter cooled to grip the male end in a leakproof manner. For larger pipe sizes, the tapered shapes have features which interlock in a leakproof manner when engaged after assembly of the pipe ends. The tapered shapes preferably are formed by a reversibly positioned forming tool which is alternately engaged with male and female pipe ends to ensure perfectly matching shapes.

18 Claims, 5 Drawing Sheets

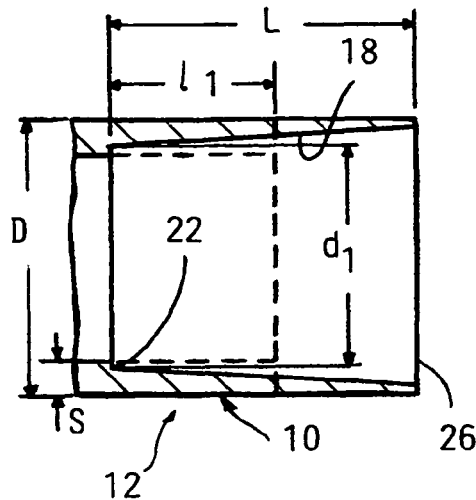
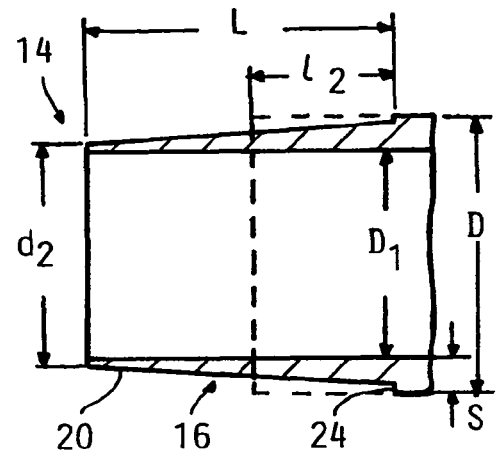
FIG. 1    FIG. 2
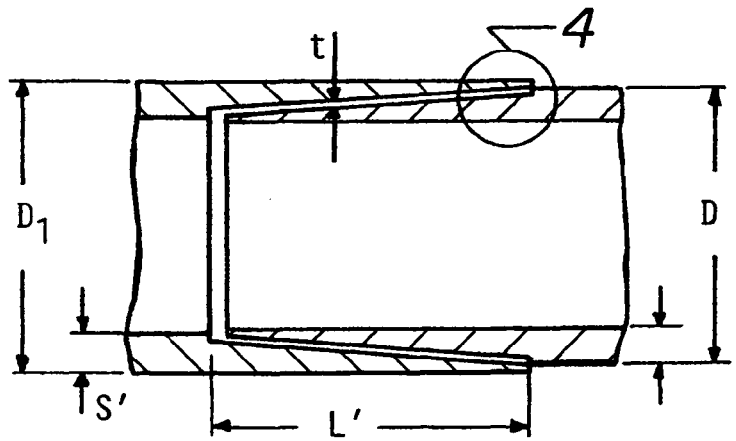
FIG. 3
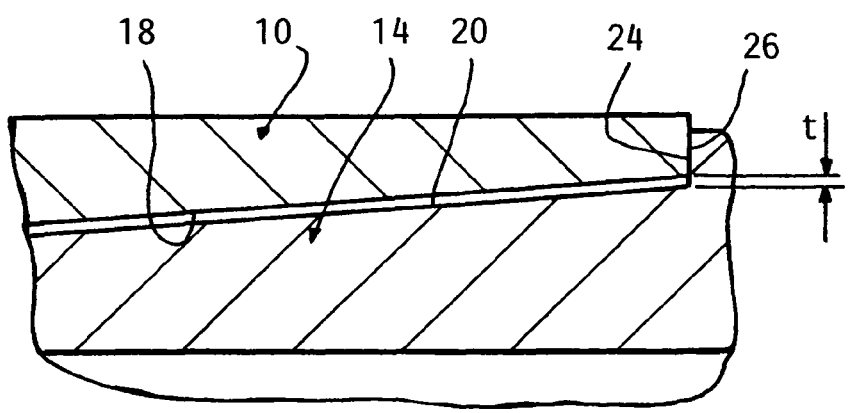
FIG. 4

METHOD FOR JOINING ENDS OF SECTIONS OF PIPE

CROSS REFERENCE TO RELATED APPLICATIONS

This application claims the benefit of U.S. provisional application Ser. No. 60/896,287 filed on Mar. 22, 2007.

BACKGROUND OF THE INVENTIONS

This invention concerns pipe joining methods, and particularly the joining of pipe ends in the fabrication of various types of pipelines, primarily in well drilling and casing in the oil and gas industry and in pipelines.

Pipe joints most commonly involve threaded coupling or end fittings. When deep drilling of wells, the pipe sections become progressively smaller in diameter due to the techniques which are employed for deep drilling. In order to increase flow from the wells the liners and casings are expanded in place in order to get a larger flow from the well. Threaded joints prevent getting a larger flow from the well. Threaded joints prevent mechanical expansion of the joints and create other problems. Another method for connecting tubular elements, such as pipes is known that provides for formation of external features on the pipe ends to be joined and crimping by plastic deformation of the female part over the male part, with formation of a multi-faceted mating surface that features a beaded collar to ensure higher strength.

This method is described in USSR Inventor's Certificate no. 603,470.

The deficiency of that method is that it is limited to connecting pipes of different diameters and requires considerable labor-intensive preparation (processing) of the ends of the pipes to be joined.

A method for connection of pipes of identical diameters is also known that features forming thicker ends of the pipes to be joined, combined with an increase in outside diameters, without altering the internal diameters to be used for joining of pipes as by welding, brazing and/or bolting.

This method is described in USSR Inventor's Certificate no. 1,703,224.

The deficiency of that method lies in the fact that there is a wall thickening in the pipe joint that makes it difficult to expand the pipe in order to increase the internal diameter of the pipes joined. This method cannot be used, for example, in the oil and gas industry for expansion of pipes in order to increase capacity such as for oil well casings.

Yet another known pipe joining method features a preliminary deformation of the mating pipe ends, assembly by inserting one pipe into the other along mating surfaces, followed by radial crimping along the entire connection length by pushing the joint section through a tapered die.

This method is described in U.S. Pat. No. 4,026,006.

The deficiency of that method arises from the lack of a tight fit between the mating surfaces of the pipes being joined such that it does not ensure leakproof joints along its entire length. Elastic relief of the pipe ends at certain sections of the joint may result in formation of a gap along the mating surfaces.

Furthermore, the pipe overlaps in the joint results in a double or almost double wall thickness and while this increases the joint strength, it also makes pressure expansion of the joined pipes problematic.

An object of the present invention is to assist in the deformed expansion of pipes in oil and gas wells and in other applications to provide an equal expansiveness of joined pipes in the joint and the rest of the pipe sections to allow deformation by a subsequent expansion of the joined ends of the pipes by maintaining the original O.D. and I.D. of the pipe ends in the pipe joint and improving the leakproof performance of the pipe joint by an interference fit of the mating pipe surfaces.

SUMMARY OF THE INVENTION

The above recited object is accomplished by a method of pipe joining particularly for sections of pipe installed in oil and gas wells that includes forming a shape on the inside of one pipe end which becomes the female end, and the outside of another pipe end which becomes a male pipe end. The mating diameters are selected to establish an interference fit. Therebetween the pipe ends are assembled by first heating the female pipe end to expand its inside diameter and inserting the male pipe end into the female pipe end with an interference fit.

The forming of the pipe ends is done by a rolled cold forming of the female pipe end inside diameter and the male pipe end is cold formed on the outside diameter, both ends thereby formed with complementary mating surfaces. The diameter of the mating shape on the male pipe is set to be bigger than the corresponding diameter of the female pipe in order to create the interference fit therebetween. The female pipe end is heated to expand its inside diameter and the male pipe end is inserted into the female pipe end to bring the features into abutment. The female pipe constricts upon cooling to tightly and sealingly grip the male pipe end during a cooling process.

The inside and outside diameter of the joined pipe ends define a wall thickness that is the same as the wall thickness of the original pipe sections so that expandability of the joined pipes along the joint is the same as that of the remaining sections of the pipes.

Both of the pipe ends are preferably tapered in complementary to each other to facilitate assembly together of the ends.

The tapered mating surfaces preferably have a 50:1 taper that provides for self-locking of the pipe ends after being assembled to further assist in preventing separation. A reversible forming tool device is preferably used to form the mating tapered surfaces of both the male and female pipe ends to insure a very good matching to insure a leakproof joint.

The tapered mating end surfaces of the pipes to be joined may have a "periodic profile" of the mating surfaces generally lying at an angle to the axis of the pipes ranging from 2° to 5°. The periodic profile comprises circumferential features which define tapered peak heights along the axis of the pipe ends such as to also comprise complementary mating tapered shapes.

The tapered mating surfaces may be in the shape of circular corrugations extending around the axis of the pipe ends.

The circular corrugations may have a triangular or trapezoidal profile, with one side having an angle in the approximate range of $\beta$: 10° to 20° and the other side $\gamma$: 30° to 45°, in order to ensure uniform enlargement of joined pipes during a pressure expansion in the joint.

Prior to joint assembly, the male pipe end is preferably covered with sealing material, such as a sealant coating or with a sticky tape or other application of sealant.

Prior to assembly of the pipe ends, the female pipe end is heated to 200° to 900° C., preferably in an inert gas atmosphere, the temperature depending on the size of the pipes and the geometry of the mating surfaces. The thermal expansion of the female pipe end necessary is $\Delta \geq \delta + 2h + 2t$, where $\delta$ is the diametrical interference, h is the corrugation height, and t is the minimum clearance on each side to allow assembly.

H7/p6; H7/r6 and H7/s6 fits are preferred for interference fits of pipes with an O.D. up to 500 mm.

The complementary end shapes ensures substantially equal resistance to plastic expansion of the joined pipes along their lengths including in the joints in order to allow pressure expansion of joined pipes by maintaining the original pipe I.D. and O.D. in the joints. These features also enhance the leakproofing of the joint by the interference fit of the mating surfaces to fulfill the above recited object of the invention.

Another feature is the optimization of the fit of the shape and dimensions of the pipe ends achieved by a rolling of the female pipe end along the I.D., to form the complementary mating surfaces with the same tool as rolling the O.D. shape of the male pipe end to insure a very good fit.

DESCRIPTION OF THE DRAWINGS

FIG. 1 is a sectional view of a female pipe end which shows the shape of the formed female pipe end created by a cold rolling process along the I.D., with the original pipe section shown in broken lines, the mating shapes of the formed taper angle being indicated.

FIG. 2 is a sectional view of a male pipe end showing the shape of the male pipe end by the same rolling process executed on the O.D., with the original pipe end shape shown in broken lines.

FIG. 3 is a sectional view of an assembled male and female pipe ends showing the clearance created by heating of female pipe end to expand the same in order to allow assembly of the pipe ends.

FIG. 4 is an enlarged view of the pipe joint shown in FIG. 1, the tapered joint shown in FIG. 3 ensuring self-locking of the pipes being joined.

DETAILED DESCRIPTION

Figure 5:
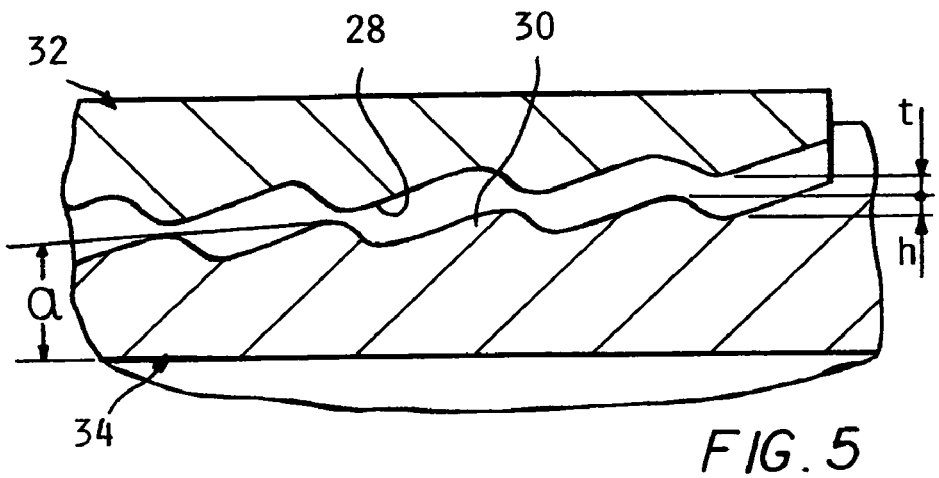
FIG. 5 is a sectional view of two mating ends of pipe sections showing an embodiment of the joint having circumferential features along the tapered mating surfaces, the successive features being arranged along a line, with the female pipe end depicted in its expanded heated condition.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIGS. 1-4, the inside diameter of one pipe end 10 of one pipe section 12 (FIG. 1) is formed over a length $l_1$ into a female pipe end preferably having a tapered shape extending a length L. The outside diameter of an end 14 of another section of pipe 16 (FIG. 2) is formed along its O.D. over length $l_2$ as by cold rolling to form a male pipe end with a preferably tapered shape 20, extending along the length L, these shapes defining complementary mating surfaces. The tapered shapes facilitates assembly of the ends and increases the strength thereof.

In order to improve the mating accuracy of the tapered surfaces 18, 20 on the female and male pipe ends 10, 14, these surfaces are preferably formed as by cold rolling using the same rolling tool which is reoriented into the respective positions relative to the pipe ends to be rolled, as described below.

The forming process causes an elongation and thinning of both pipe ends 10 and 14 to a length L while maintaining constant the original outside diameter (O.D.) of the female pipe end 10 and the inside diameter (I.D.), of the male pipe end 14.

A preferred forming tool device is described in detail below, which is used to execute a roll forming process.

A step 22 is formed in the inside of the female end and step 24 on the outside of the male end 16. The tapered complementary and mating surfaces 18, 20 on the respective ends 10, 14 of pipe sections 12, 16 to be joined may also be produced by turning, but that method is more expensive. In addition, cold forming the pipe end shapes by rolling enhances their strength by improving the mechanical properties of the metal 11 used to produce the pipes (typically steel).

The inside diameter of the tapered mating surface 20 of the male pipe end 14 is made larger than the corresponding dimensions of the taper 18 on the female pipe end 10 in order to create an interference fit. The preferred settings for interference fit of pipes with an O.D. up to 500 mm are H7/p6; H7/r6; H7/s6.

For example, for pipes with an O.D. of 500 mm and wall thickness S of 10 mm, smallest diameter $d_1$ (FIG. 1) of the female pipe end 10 is Ø 488H7 (+0.63/−0), while $d_2$ (FIG. 2) of the male pipe end 14 is larger, i.e. Ø 488 p6 (+1.08/+0.68) or Ø 488 r6 (+1.72/+1.32) or Ø 488 s6 (+2.92/+2.52). As an example, for the following mean arithmetic diameters: Ø 488H7 (+0.63/−0), Ø 488 r6 (+1.72/+1.32): $d_1$=488.32 mm and $d_2$=Ø489.52 mm.

The diametrical interference that is created by this fit is: $\delta = d_2 - d_1 = 489.52 - 489.32 = 1.2$ mm.

Prior to joining the pipe ends 10, 14 the female end 10 of the pipe 12 is heated into a range of 200° to 900° C. depending on the pipe size and the geometry of the mating surfaces. This is preferably done in an inert gas atmosphere to avoid chemical changes in the metal which could detrimentally affect its properties. When the female pipe end 10 is heated, its volume increases to expand its diameter and length. The increase of the pipe end linear dimensions (pipe O.D., end section length L' and wall thickness S') during heating (FIG. 3) can be determined from the formula: $D' = (D + k \cdot T')$, where k is the thermal expansion coefficient of the pipe material and T' is the heating temperature, ° C.

Heating of the end of the low-alloy steel pipe (L of 100 mm, O.D. of 500 mm, wall thickness of 10 mm) up to 600° C. at k=0.0000145 will result in the increase of the minimum diameter $d_1$ of the tapered mating surface to $d_1$=488.32× (1=0.0000145×600)=492.57 mm.

Thermal expansion of the female pipe end 10 along diameter $d_1$ will be: $\Delta = (d_1 - d_1) = 4.25$ mm.

Subsequently, the female end 10 and male end 14 of the pipes 12 and 16 are assembled together by sliding the female pipe end 10 over the male end 14 along mating tapered surfaces 18, 20 (FIG. 3) until the end 26 of the female pipe end 10 abuts the shoulder 24 of the male pipe end 14.

When pipe ends with an O.D. of 500 mm are assembled together, the clearance on one side between the sides of the pipe ends 10, 14 will be: t=(492.57−489.52)/2=⅛mm, which will ensure free sliding insertion of the male pipe end 14 into the female pipe end 10.

According to the method of the invention, the tapered mating surfaces of the pipe ends 10, 14 to be joined have a 50:1 taper, which ensures self-locking of the pipe ends being joined (FIG. 4) to prevent separation of the ends 10, 14. This taper is most efficient on small pipe wall thickness S≦5 mm and requires precise mutual positioning of the tapered mating surfaces 18, 20 of the pipe ends 10, 14 to be joined.

Figure 6:
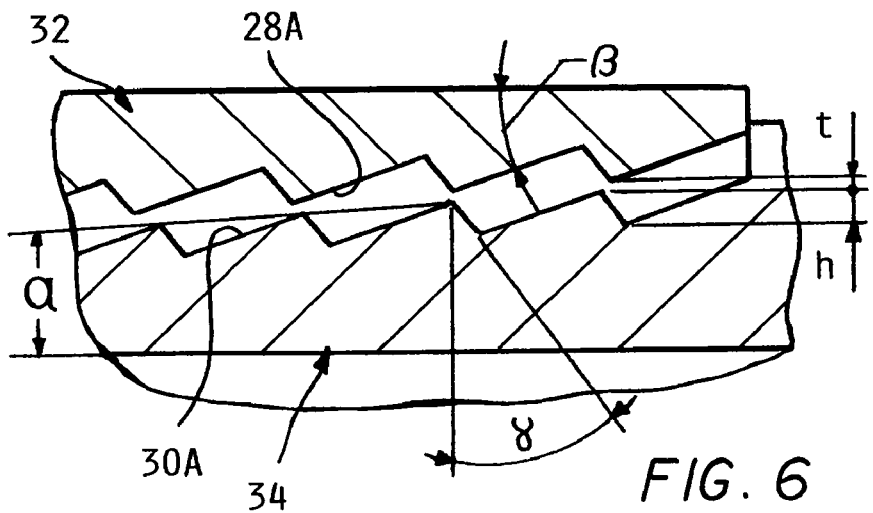
FIG. 6 is a sectional view taken through another embodiment of a joint made by a method of the invention showing tapered mating surfaces that have corrugations in the shape of triangles with the female pipe end shown in the heated expanded condition.

If the wall thickness of the pipe ends to be joined is equal to or greater than 5 mm, the tapered mating surfaces should be formed with complementary circumferential features 28, 30, with the angle between a line extending along the peaks of the mating surfaces 28, 30 and the axis of the pipe being in the 2° to 5° range (FIG. 5). Also, the features may have the shape of circular corrugations 28A, 30A, as shown in FIG. 6.

It is noted that the female pipe end 10 is lengthened during heating so that the features 28, 28A, 30, 30A appear misaligned, but become sufficiently aligned during cooling to allow inter-fitting as the female pipe end 10 cools.

Figure 7:
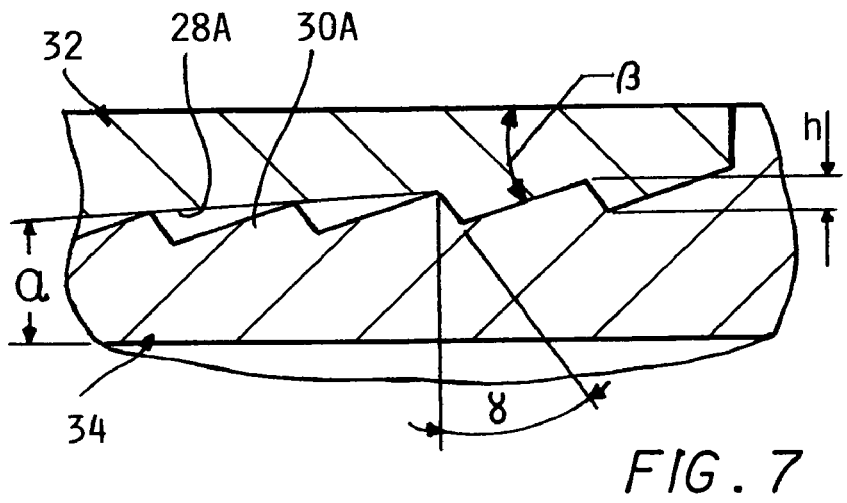
FIG. 7 is a sectional view of the pipe ends shown in FIG. 6 with both pipe ends joined by gripping engagement of the female pipe end to the male pipe end as a result of cooling and contraction of the female pipe end.

Final joining of the male and female pipe ends 32 and 34 is accomplished by engagement of the mating surfaces with an interference fit with the tight gripping of the male pipe end 34 by the female pipe end 32 as a result of its becoming cooled (FIG. 7).

The corrugations 28, 28A, 30, 30A are perfectly matched to each other due to their manner of forming as described below which makes it possible to produce strong and leak-proof joints due to the interference fit of the dimensions of the mating surfaces of the corrugations, which causes an elastic deformation of the pipe ends 32, 34 during their joining establishing several interlocks by the circular corrugations 28, 30 being inter fit to each other.

Leakproofing of the joints 28A, 30A may be improved by applying a sealant to the male pipe end 34 such as with a sealant coating or the application of sticky tape.

This joining method also ensures good centering of the mating pipe ends, equal pipe expansion stiffness along the cross sections, including the joint, in both axial and radial directions.

The preferred shape of the tapered mating surfaces of the pipes to be joined comprises a triangular or trapezoid lateral section shapes 28A, 30A.

The angle of the tapered mating surfaces "a" is equal to 2° to 5° and the angles of the sides of the corrugation profiles is β=10 to 20° and γ=30 to 45°, which angles may vary in that range in correspondence with the pipe diameter D, thickness S, the joint length L, corrugation height h, the female pipe end heating temperature T, material characteristics, and operating conditions.

It is possible to modify the mating shape parameters within the ranges indicated in order to produce an adequate number of corrugations (not less than 3-5) that would ensure a strong and leak-proof pipe joint and create an optimal corrugation profile geometry for plastic enlargement of the joined pipe diameters.

The process was tested during joining of precision seamless hot-rolled pipes (O.D. of 100 mm, wall thickness of 8 mm). Tapered mating surfaces were formed on 50 mm long pipe ends using two options: a 50:1 taper and a periodic profile with the mating surface angles of a of 3° and circular corrugations angles of β of 15° and γ of 45°.

The pipe joining quality was evaluated by external examination of the joint and individual 10-16 mm long samples that were produced during cutting of the joint. External examination showed absence of any slots and gaps along the entire pipe joint.

Pipe samples were also tested for the ability to have their diameter enlarged by flaring of the pipe ends with tapered mandrels of various taper angles, followed by evaluation of the flaring extent. The samples produced from the source pipe and from the joint successfully withstood a 30% plastic deformation enlargement up to 130 mm diameter.

Figure 8:
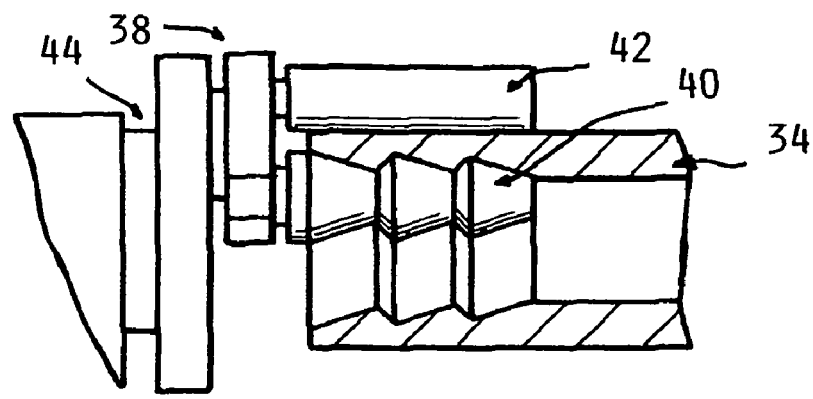
FIG. 8 is a sectional view of a female pipe end with a forming tool device in position forming the tapered shape into the inside diameter thereof.
Figure 9:
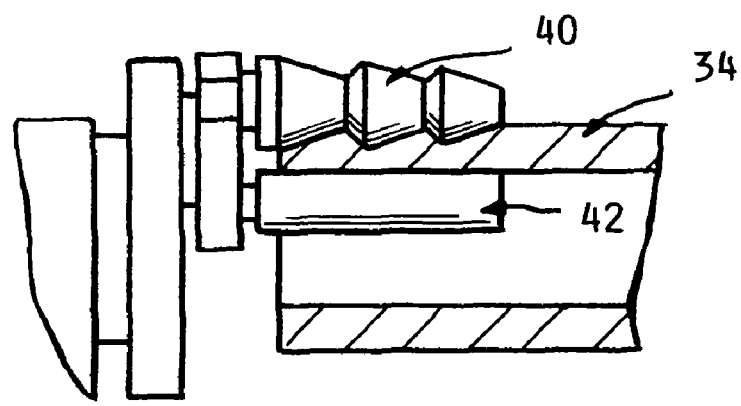
FIG. 9 is a sectional view of a male pipe end with the forming tool device in a reversed position to form the profile shape on the outside diameter thereof.
Figure 10:
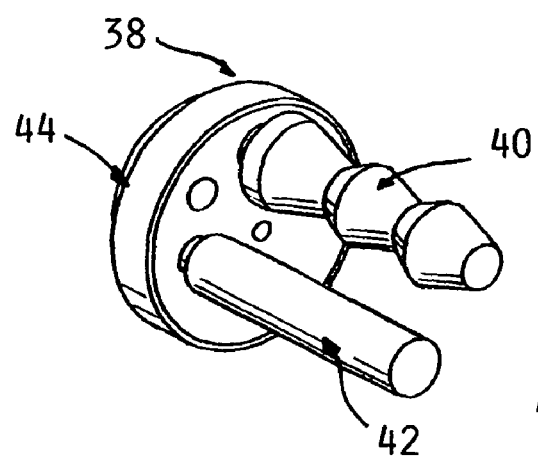
FIG. 10 is a pictorial view of the forming tool device shown in FIGS. 8 and 9.

FIGS. 8-10 show the forming steps and a forming tool device 38, including a contoured profiling roller 40 rotatably mounted spaced apart from an adjacent support roller 42 projecting from a housing 44 which is rotated during the forming process. As shown in FIG. 8, the female pipe end 32 is formed by advancing the profiling roller radially out into the inside diameter while rotating the housing 44 to form the corrugations 28A.

The support roller 42 holds the female pipe end 32 to allow the profiling roller 40 to develop forming pressure as it is advanced radially towards the support roller 42.

The radial positions of the support and profiling rollers 40, 42 are reversed when forming the male pipe end 34 as shown in FIG. 9, with the profiling roller 44 moved to the outside to form the stepped increased diameter corrugations.

Figure 10A:
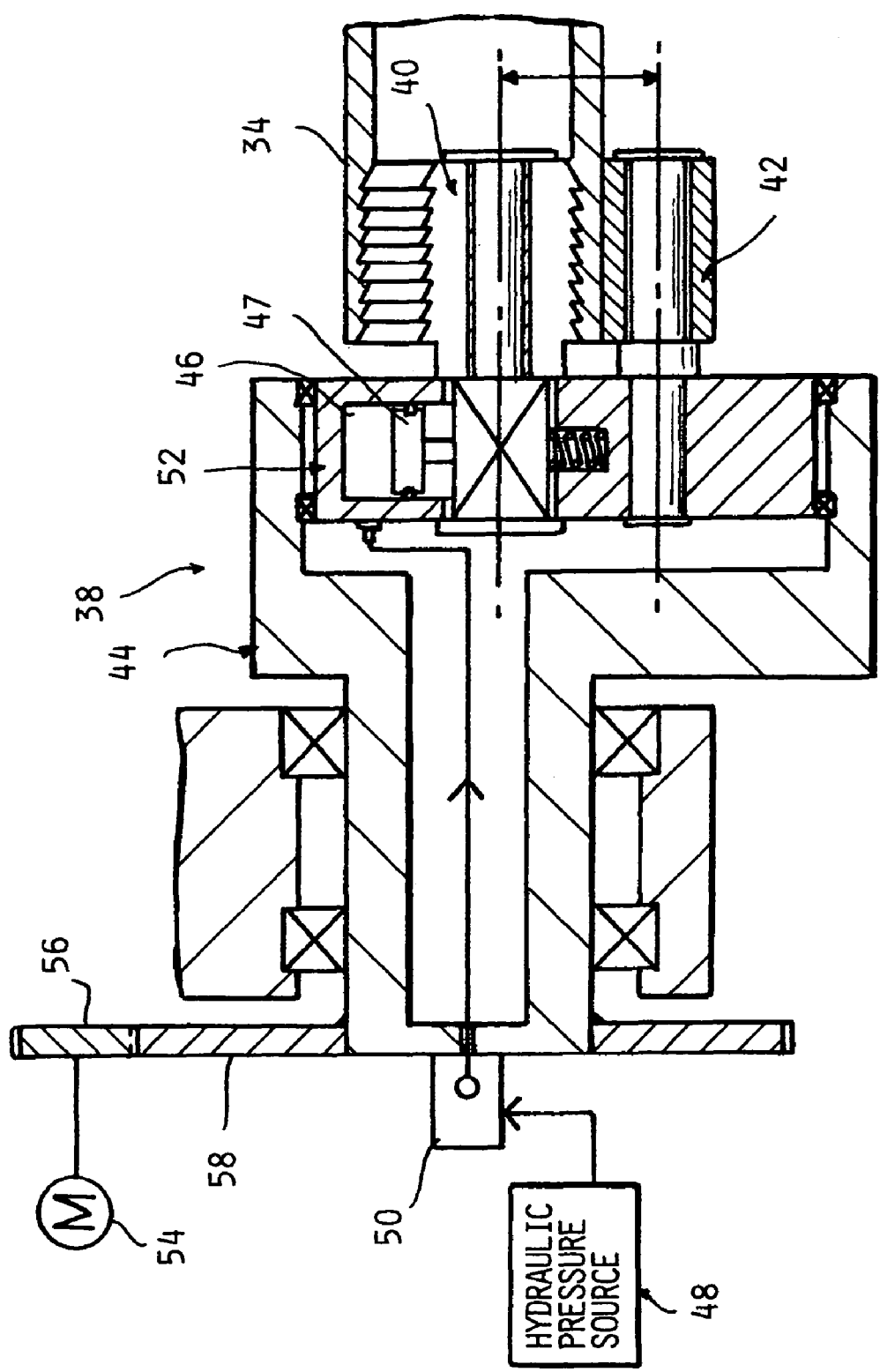
FIG. 10A is an enlarged sectional view of a forming tool device which could be used to shape the male and female pipe ends.

FIG. 10A shows further details of one form of the forming tool device 38. The profiling roller 40 is radially moveable by a piston radially advanced as by the application of hydraulic pressure in a chamber 46 defined in part by a piston 47, chamber 46 connected to a hydraulic pressure source 48 connected to a rotary fluid coupling so which is connected to the chamber 46. Suitable controls are provided (not shown). A rotor 52 rotatable in the housing 44 has the rollers 40, 42 eccentrically located so as to allow the rollers to be alternatively reversed in their radial position.

The housing 44 is rotated by a drive motor 54 and gears 56, 58.

FIGS. 11A-11D show a typical apparatus for automating the joining method according to the invention.

Figure 11A:
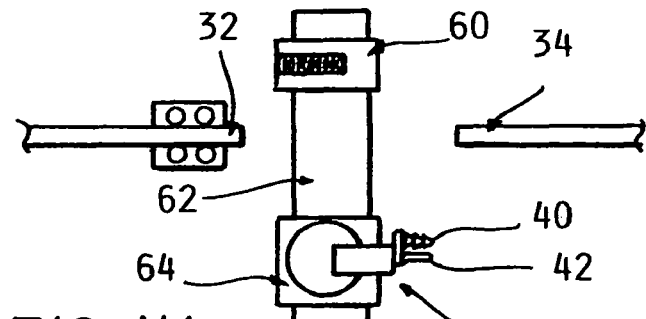
FIGS. 11A-11D are diagrammatic representations of an apparatus for handling and forming the male and female ends of pipe sections and assembling the formed ends into a joint.
Figure 11B:
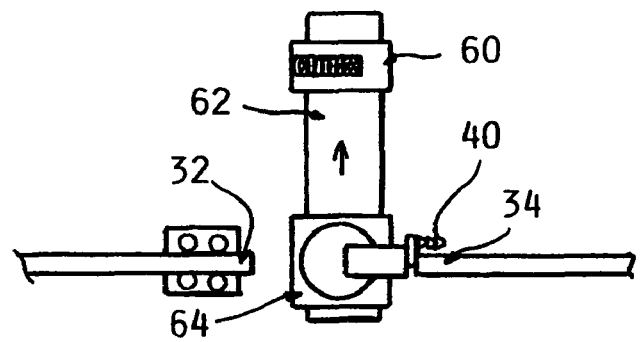
Figure 11C:
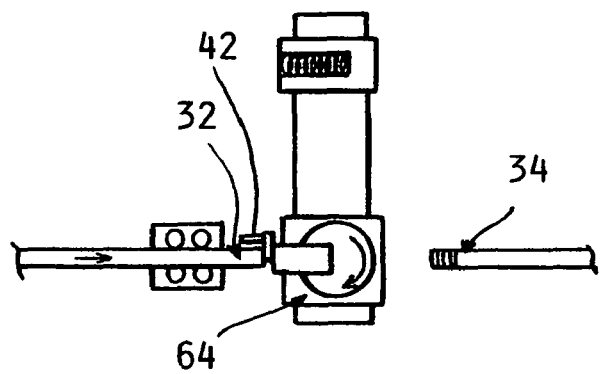
Figure 11D:
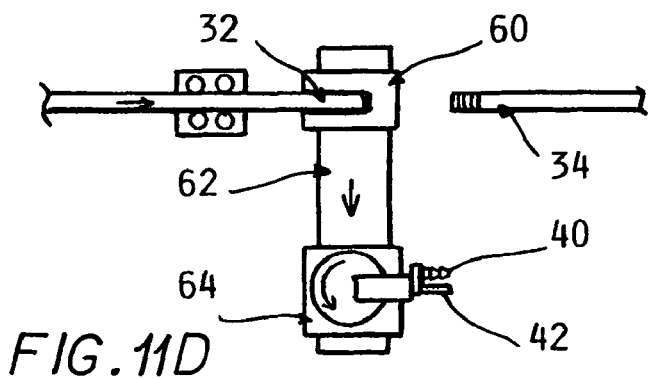

In FIG. 11A, an induction heater 60, for example, is mounted on one side of a shuttle 62 with a forming tool device 38 on a turntable mounted at the other side.

The shuttle 62 moves the forming tool device 38 into alignment with male pipe end 32 and the rollers 40, 42 advanced during forming of the O.D. as described above.

The turntable 64 is operated after retraction of the male pipe end 34 to align the forming tool device 38 with the female pipe end 32 which is advanced onto the rollers 40, 42 and forming of the ID is carried out as described.

The female pipe end 32 is then retracted off the rollers 40, 42 and the shuttle brings the induction heater 60 into alignment with the female pipe end 32 which is advanced into the induction heater 62 where heating to the proper temperature is carried out.

As noted, this is preferably done in an atmosphere of inert gas such a helium, argon etc. to avoid corrosion or other chemical changes in the steel if that material is used to construct the pipes.

Thereafter, the male and female pipe ends are assembled together and cooled to create the joint as described above.

Thus, oil and gas well pipe sections are placed in an oil well and successively joined at the site by establishing the joints as described and subsequently the lowermost sections expanded by plastic deformation while in place to increase the flow rate out of the well. This same joining method can be used in pipelines and other applications.

The invention claimed is:

1. A method for joining one end of each of first and second substantially equal sized inside and outside diameter pipe sections, comprising:
    forming a taper on the inside diameter of an end of a first pipe section end increasing in diameter in a direction towards said end to form female pipe end thereon, while maintaining the outside diameter of said first pipe section substantially constant along both said female pipe end and the remaining portion of said first pipe section;
    forming a complementary taper on the outside of an end of the second pipe section of increasing diameter in a direction away from said end to form a male pipe end thereon, said male pipe end larger in diameter along said taper than said taper on said female end while maintaining the inside diameter substantially constant, along said male pipe end and remaining portions of said second pipe section;
    heating the female pipe end to increase its inside diameter sufficiently to allow said female pipe end to be received over the male pipe end, and advancing said heated female pipe end over said male pipe end; and, thereafter cooling said female pipe end to contract said taper of said female pipe end so as to shrink grip said male pipe end tightly, whereby a pipe joint is formed having substantially the same inside and outside diameter as said remaining portions of said pipe sections.

2. The method according to claim 1 wherein said tapers are generally tapered at a sufficiently shallow angle to be self locking.

3. The process according to claim 2 wherein a 50:1 taper is formed on each of said pipe ends.

4. The method according to claim 1 wherein a series of separate circumferential features are formed into said tapers on said inside of said female pipe end and the outside of said male pipe end, said circumferential features on the tapers of said female pipe end and the outside of said male pipe end formed to be complementary to each other so as to be interfit with each other upon cooling of said female pipe end.

5. The method according to claim 4 wherein said circumferential features on male and female pipe ends are formed as a series of separate circular corrugations of progressively greater diameter in a direction away from an end of said male pipe end and towards an end of said female pipe end.

6. The process of claim 5 wherein the tapers are formed to have a mating surface angle ranging from 2° to 5°.

7. The method according to claim 5 wherein the circular corrugations are formed into a triangular in section shape, said corrugations including shallow surfaces forming said triangular shape lying within 10° to 20° with respect to an axial plane and steeper surfaces also forming said triangular shape lying within 30° to 45° with respect to a radial plane in order to ensure uniform expansion of the joined pipe ends.

8. The method according to claim 5 wherein prior to joining, at least one pipe end is covered with a sealant.

9. The method according to claim 5 wherein the female pipe end is heated to 200° to 900° C. prior to assembly, with the thermal expansion of the female pipe being: $\Delta \geqq \delta + 2h\ 2t$, where $\delta$ is the diametrical interference, h is the height of said corrugations, t is the minimum clearance on each side to ensure assembly.

10. A method for forming a pipe joint according to claim 1 including forming said tapers of said inside of said female pipe end and the outside of the male pipe end by plastic deformation of each of said pipe ends.

11. A method for forming a pipe joint according to claim 1 wherein said forming of each of said tapers on said pipe ends is carried out with the same tool repositioned to alternately engage said outside diameter of said male pipe end and the inside diameter of said female pipe end.

12. The method according to claim 11 wherein said tool projects from a rotary member to enable location of said tool in radially reversed positions on a rotatably driven housing to alternately be engageable with said inside of said female pipe end and said outside of said male pipe end.

13. The method according to claim 1 further including forming a shoulder on said male pipe end against which an end of said female pipe end abuts when heated and assembled onto said male pipe end.

14. The method according to claim 1 wherein said female pipe end is heated in an inert gas atmosphere.

15. A method for joining together adjacent ends of substantially equal sized inside and outside diameter first and second sections of pipe prior to installing into an oil well, comprising:
    forming a pipe joint between adjacent ends of successive pipe sections of equal inside and outside diameters prior to advancing into said oil well comprising:
    forming a taper generally increased diameter shape on the inside of one end of a first pipe section to form a female end thereon having an increasing diameter in a direction towards an end of said female end while maintaining an outside diameter of said female end to be the same as remaining portions of said first pipe section;
    forming a complementary taper on the outside of the one end of a next adjacent successive second pipe section to form a male end thereon increasing in diameter in a direction away from said male pipe end and having larger diameters than the diameter of the taper on the inside of said female pipe end, while maintaining the inside diameter of said male pipe end and remaining portions of said second pipe section substantially constant;
    heating the female pipe end to increase its taper inside diameter sufficiently to allow said female pipe end to be received over the taper of the male pipe end, and advancing said heated female pipe end over said male pipe end; and thereafter cooling said female pipe end to contact said taper of said female pipe end so as to grip said taper of said male pipe end tightly, whereby a pipe joint is formed having substantially the same inside and outside diameter as said remaining portions of said pipe sections;
    repeating these steps for each successive pipe section introduced into said well; and,
    thereafter expanding at least some of said successive joined pipe sections in said well by plastic deformation induced by hydraulic pressure.

16. The method according to claim 15 wherein said male and female pipe ends are generally tapered at a sufficiently shallow angle to be self locking when assembled together.

17. The method according to claim 15 wherein said pipe end tapers are formed to have a series of separate circumferential features formed into said male and female pipe ends configured to be complementary to each other so as to become interfit with each other upon cooling of said female pipe end.

18. The method according to claim 17 wherein said circumferential features on said pipe ends are formed as a series of separate circular corrugations of progressively greater diameter in a direction away from said male pipe end on said taper of said male pipe end and towards said female pipe end on said taper of said female pipe end.

* * * * *